May 11, 1954
E. M. JUSTIZ
2,678,377
IMMERSION ELECTRIC HEATER
Filed Feb. 12, 1953
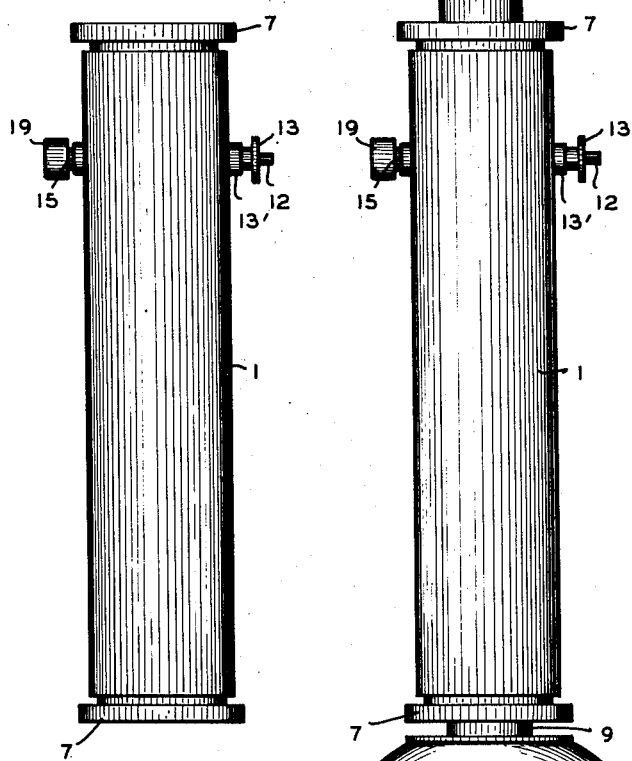
FIG. 1
FIG. 2
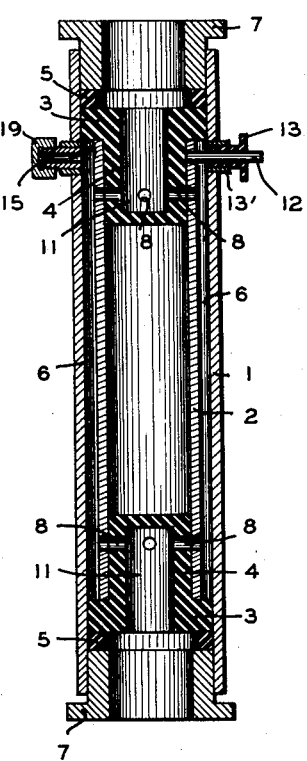
FIG. 3
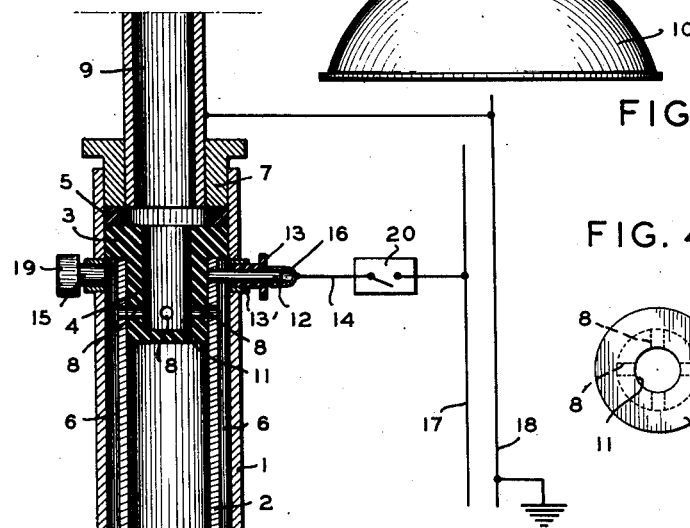
FIG. 6
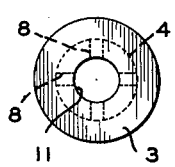
FIG. 4
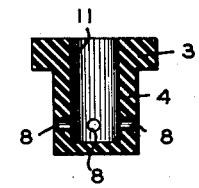
FIG. 5
INVENTOR,
EUDALDO MUNOZ JUSTIZ
BY
ATTORNEY Patented May 11, 1954

2,678,377

UNITED STATES PATENT OFFICE 2,678,377

IMMERSION ELECTRIC HEATER

Eudaldo Munoz Justiz, Micanor del Camp, Mahanao, Cuba

Application February 12, 1953, Serial No. 336,613

6 Claims. (Cl. 219—40)

This invention relates to an electric heater, and more particularly to an apparatus for use in heating liquids, such as water.

This invention is an improvement over the electric heater shown and described in my Patent No. 2,533,469, dated December 12, 1950.

The object of the invention is to provide an electric heater which utilizes the ionic conductivity of the liquid being heated, such as water whereby the liquid will act as the resistance between a pair of electrodes to cause the liquid to be efficiently and quickly heated.

Another object of the invention is to provide an electric heater which will quickly heat large quantities of water at a small cost, the water being heated by passing between a pair of electrodes which are connected to a suitable source of electrical energy and wherein the water will be heated quickly and economically.

Still another object of the invention is to provide an electric heater which can be used for supplying hot water for various appliances such as showers, or the kitchen or for a washing machine or in any other locality where large quantities of hot water are required.

A further object of the invention is to provide an electric heater which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the heater of the present invention.

Figure 2 is a side elevational view showing the heater of the present invention attached to a water pipe and adapted to be used for supplying water to a shower.

Figure 3 is a longitudinal sectional view taken through the heater.

Figure 4 is a plan view of one of the caps.

Figure 5 is a longitudinal sectional view taken through the cap of Figure 4.

Figure 6 is a longitudinal sectional view taken through the upper portion of the apparatus shown in Figure 2 and showing the electrical connections.

Referring in detail to the drawings, the numeral 1 designates a hollow cylindrical electrode which may be made of a suitable metal, and arranged interiorly of the cylindrical electrode 1 is a second cylindrical electrode 2. The electrodes 1 and 2 are separated from each other and also are insulated from each other. Arranged at each end of the interior electrode 2 is a cap which is fabricated of a suitable insulating material, and the cap or plug includes a head 3 and a neck 4 of reduced diameter. The neck 4 is snugly positioned in the corresponding end of the interior electrode 2, and the assembly including the interior electrode 2 and the two caps is snugly positioned in the outer electrode 1 whereby the head 3 of each cap tightly engages the interior wall of the outer electrode 1. This provides that there will be a space between the electrodes 1 and 2 and also this construction of the caps will prevent accidental movement of the interior electrode 2 toward the outer electrode 1.

Each of the caps is provided with a longitudinally extending bore 11 and communicating with the bore 11 is a plurality of transverse or radially extending perforations 8. The perforations 8 in the cap are arranged in registry with similar perforations in the interior electrode 2 and thus communication is established between the bore 11 and the space 6 between the two electrodes. Arranged within the outer electrode 1 is a pair of rings or washers 5 which may be made of a suitable insulating material and a bushing 7 is provided for each end of the outer electrode 1. The bushings 7 serve to maintain the interior electrode 2 immobile in its adjusted position and thereby prevent any longitudinal shifting of the inner electrode 2 within the outer electrode 1. Thus, the bushings 7 serve to maintain the inner electrodes 2 in their proper positions and also facilitate the connection of the heater of the present invention to a pipe 9 which may lead from a source of supply to a shower 10 or other appliance.

A plug 12 has its inner end arranged in engagement with the interior electrode 2, and the plug 12 passes through an insulating ring 13 which is positioned within a small tube 13', the tube 13' being arranged contiguous to the upper end of the outer electrode 1. A casing 16 is mounted over the outer end of the plug 12 and an electric cable or conductor 14 connects the casing 16 to a switch 20. The switch 20 may be connected to a wire 17 which forms part of an electric line. The neutral line 18 is grounded and may be electrically connected to the exterior electrode 1 so that the water passing through the heater will have the same ground potential.

After the electrodes have been used for a period of time, they may become covered with a film of oxides and carbonates which may reduce the efficiency and prevent efficient operation of the electrodes. Thus, it is necessary that the electrodes be cleaned with a suitable cleaning solution, as for example a solution of hydrochloric acid. To permit such cleaning, a pipe or conduit 15 extends through the wall of the outer electrode 1 and a cap 19 having a washer therein may be arranged in threaded engagement with the pipe 15. Thus, by removing the cap 19, the hydrochloric acid solution can be poured through the small pipe 15 to clean the electrodes.

It is to be understood that the heater of the present invention can be constructed of different sizes and shapes. Also, the bushings 7 may have other configurations as for example the bushings 7 may be introduced into the electrode 1 either by pressure, as shown in Figure 3, or by threading. Further, the bushings 7 may be arranged on the outside of the exterior electrode 1 if desired. Furthermore, the heads 3 of the caps may be provided with a plurality of longitudinally extending perforations which communicate with the space 6 to facilitate the circulation of the water between the electrodes.

In use, the switch 20 is closed and the water valve is opened to thereby permit the water to pass from the pipe 9 through the upper bushing 7 and then through the upper ring 5. The water then passes through the bore 11 in the upper cap and then the water passes through the perforations 8 into the free space 6 between the pair of electrodes. From here the water passes down through the space 6 and then through the perforations 8 in the lower cap toward and through the bore 11 in the lower cap and then through the lower ring 5. Finally the water passes through the bushing 7 and is discharged through the shower 10 or through any other appliance which may be used. As the water enters the space 6 between the pair of electrodes and closes the circuit, the electric current will pass between the electrodes to thereby heat the water. Since the temperature of the water is a function of its speed, by adjusting the water control valve, the temperature of the water can be readily regulated.

I claim:

1. In an electric heater, an outer cylindrical electrode, an inner concentrically arranged electrode, a cap fabricated of insulating material and including a neck portion snugly seated in each end of said inner electrode, a head of greater diameter than said neck portion snugly engaging said outer electrode, there being a longitudinally extending bore arranged in each of said caps, the neck portion of each of said caps being provided with a plurality of radially extending perforations communicating with said bore, there being a space between said electrodes communicating with said perforations, means for connecting said heater to a water pipe, and means for connecting said electrodes to a source of electrical energy.

2. In an electric heater, an outer cylindrical electrode, an inner concentrically arranged electrode, a cap fabricated of insulating material and including a neck portion snugly seated in each end of said inner electrode, a head of greater diameter than said neck portion snugly engaging said outer electrode, there being a longitudinally extending bore arranged in each of said caps, the neck portion of each of said caps being provided with a plurality of radially extending perforations communicating with said bore, there being a space between said electrodes communicating with said perforations, means for connecting said electrodes to a source of electrical energy, said means comprising a plug having its inner end engaging said inner electrode, a casing mounted on the outer end of said plug, and conductors for electrically connecting said casing and outer electrode to a power line.

3. The apparatus as described in claim 2, and further including means for connecting said heater to a water pipe.

4. In an electric heater, an outer cylindrical electrode, an inner concentrically arranged electrode, a cap fabricated of insulating material and including a neck portion snugly seated in each end of said inner electrode, a head of greater diameter than said neck portion snugly engaging said outer electrode, there being a longitudinally extending bore arranged in each of said caps, the neck portion of each of said caps being provided with a plurality of radially extending perforations communicating with said bore, there being a space between said electrodes communicating with said perforations, means for connecting said electrodes to a source of electrical energy, said means comprising a plug having its inner end engaging said inner electrode, a casing mounted on the outer end of said plug, conductors for electrically connecting said casing and outer electrode to a power line, and means for connecting said heater to a water pipe, said means comprising a bushing snugly engaging each end of said outer electrode, said bushings being provided with a longitudinally extending bore, and an insulated ring interposed between said bushings and caps.

5. The apparatus as described in claim 4, and further including means for introducing a cleaning solution onto said electrodes.

6. In an electric heater, an outer cylindrical electrode, an inner concentrically arranged electrode, a cap fabricated of insulating material and including a neck portion snugly seated in each end of said inner electrode, a head of greater diameter than said neck portion snugly engaging said outer electrode, there being a longitudinally extending bore arranged in each of said caps, the neck portion of each of said caps being provided with a plurality of radially extending perforations communicating with said bore, there being a space between said electrodes communicating with said perforations, means for connecting said electrodes to a source of electrical energy, said means comprising a plug having its inner end engaging said inner electrode, a casing mounted on the outer end of said plug, conductors for electrically connecting said casing and outer electrode to a power line, and means for connecting said heater to a water pipe, said means comprising a bushing snugly engaging each end of said outer electrode, said bushings being provided with a longitudinally extending bore, an insulated ring interposed between said bushings and caps, and means for introducing a cleaning solution onto said electrodes, said last named means comprising a conduit extending through said outer electrode and communicating with the space between said electrodes, and a cap detachably mounted on said conduit.

References Cited in the file of this patent

UNITED STATES PATENTS

| Number | Name | Date |
|---|---|---|
| 887,331 | Johnson | May 12, 1908 |
| 986,037 | Albert | Mar. 7, 1911 |
| 2,167,718 | Harris, Jr., et al. | Aug. 1, 1939 |